United States Patent
Barachha

(10) Patent No.: US 10,885,279 B2
(45) Date of Patent: Jan. 5, 2021

(54) DETERMINING STATES OF CONTENT CHARACTERISTICS OF ELECTRONIC COMMUNICATIONS

(71) Applicant: Microsoft Technology Licensing, LLC, Redmond, WA (US)

(72) Inventor: Gajendra Kasturchand Barachha, Maharashtra (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 153 days.

(21) Appl. No.: 16/184,704

(22) Filed: Nov. 8, 2018

(65) Prior Publication Data

US 2020/0151251 A1 May 14, 2020

(51) Int. Cl.
| | |
|---|---|
| *G06F 40/30* | (2020.01) |
| *G06F 40/253* | (2020.01) |
| *G06F 40/205* | (2020.01) |
| *G06F 40/289* | (2020.01) |
| *G06F 40/268* | (2020.01) |
| *G06N 3/08* | (2006.01) |

(52) U.S. Cl.
CPC ............ *G06F 40/30* (2020.01); *G06F 40/205* (2020.01); *G06F 40/253* (2020.01); *G06F 40/268* (2020.01); *G06F 40/289* (2020.01); *G06N 3/08* (2013.01)

(58) Field of Classification Search
CPC .... G06F 40/205; G06F 40/211; G06F 40/268; G06F 40/284; G06F 40/289; G06F 40/30; G06F 40/35; G06F 40/253; G06N 3/08
See application file for complete search history.

(56) References Cited

U.S. PATENT DOCUMENTS 6,161,083 A * 12/2000 Franz ................... G06F 40/211
704/4
6,470,307 B1 * 10/2002 Turney ................... G06F 16/30
704/9
(Continued)

OTHER PUBLICATIONS

"Emma: E-Mail Mood Analyzer", Retrieved From: https://appsource.microsoft.com/en-us/product/office/WA104379982?tab=Overview, Retrieved on: Feb. 2, 2019, 2 Pages.
(Continued)

*Primary Examiner* — Eric Yen
(74) *Attorney, Agent, or Firm* — Schwegman Lundberg & Woessner, P.A.

(57) ABSTRACT

Disclosed in some examples are methods, systems, devices, and machine-readable mediums for determining states of content characteristics of electronic messages. In some embodiments, the probability of the states of the content characteristics of electronic messages are determined. Some embodiments determine a scores for states of content characteristics. Some embodiments determine a score for electronic messages for content characteristic diversity and inclusion based on a probability of a gender-bias state, a probability of a gender-neutral state, and a probability of not applicable to gender-bias state or gender-neutral state. In some embodiments the probabilities are determined based on a natural language model that is trained with data structures that relate training phrases to states of content characteristics.

20 Claims, 12 Drawing Sheets

(56) References Cited

U.S. PATENT DOCUMENTS

| | | | |
|---|---|---|---|
| 7,720,683 B1* | 5/2010 | Vermeulen | G10L 15/22 704/254 |
| 8,554,701 B1* | 10/2013 | Dillard | G06Q 30/0601 706/12 |
| 8,682,647 B1* | 3/2014 | Lee | G06F 16/3329 704/9 |
| 8,930,377 B2* | 1/2015 | Avner | G06F 16/367 707/748 |
| 9,047,271 B1* | 6/2015 | Mengibar | G06F 40/279 |
| 9,053,416 B1 | 6/2015 | De Leo et al. | |
| 9,524,464 B2 | 12/2016 | Davulcu et al. | |
| 9,678,948 B2 | 6/2017 | Bhatt | |
| 9,710,459 B2 | 7/2017 | Baldwin et al. | |
| 9,756,003 B2 | 9/2017 | Bastide et al. | |
| 10,042,880 B1* | 8/2018 | Bodapati | G06F 40/14 |
| 10,242,260 B1* | 3/2019 | Shen | G06F 40/174 |
| 10,380,490 B1* | 8/2019 | Somasundaran | G06N 5/048 |
| 10,467,339 B1* | 11/2019 | Shen | G06F 40/205 |
| 10,592,480 B1* | 3/2020 | Joshi | G06F 16/353 |
| 2004/0199375 A1* | 10/2004 | Ehsani | G10L 15/193 704/4 |
| 2011/0238674 A1* | 9/2011 | Avner | G06F 16/367 707/748 |
| 2012/0316862 A1* | 12/2012 | Sultan | G06F 40/268 704/4 |
| 2013/0173269 A1* | 7/2013 | Adler | G06F 40/289 704/251 |
| 2016/0028681 A1 | 1/2016 | Freire et al. | |
| 2016/0294755 A1 | 10/2016 | Prabhu | |
| 2017/0365000 A1* | 12/2017 | Wittkotter | G06F 17/18 |
| 2018/0060426 A1* | 3/2018 | Gluck | G06F 16/316 |
| 2018/0089171 A1 | 3/2018 | Arquero et al. | |
| 2018/0197094 A1 | 7/2018 | Lee et al. | |
| 2018/0203848 A1 | 7/2018 | Perez et al. | |
| 2018/0373701 A1* | 12/2018 | McAteer | G06F 16/3338 |
| 2019/0378171 A1* | 12/2019 | Bhat | G06Q 30/0269 |
| 2019/0385711 A1* | 12/2019 | Shriberg | G10L 25/66 |
| 2020/0142999 A1* | 5/2020 | Pedersen | G06F 16/35 |

OTHER PUBLICATIONS

Wang, Shanglun, "How to Build an Email Sentiment Analysis Bot: An NLP Tutorial", Retrieved From: https://www.toptal.com/java/email-sentiment-analysis-bot, Retrieved on: Feb. 6, 2019, 13 Pages.

Alikaniotis, et al., "Automatic Text Scoring Using Neural Networks", In Repository of arXiv:1606.04289, Aug. 3, 2017, 11 Pages.

Jha, A., et al., "When does a Compliment become Sexist? Analysis and Classification of Ambivalent Sexism using Twitter Data", In Proceedings of the Second Workshop on Natural Language Processing and Computational Social Science, Aug. 3, 2017, pp. 7-16.

Luna, Jessica, "3 New Tools to Help You Write More Diverse Job Descriptions", Retrieved From: https://blog.ongig.com/writing-job-descriptions/diversity-tools/, Apr. 26, 2017, 7 Pages.

"International Search Report and Written Opinion Issued in PCT Application No. PCT/US19/058991", dated Jan. 23, 2020, 11 Pages.

* cited by examiner

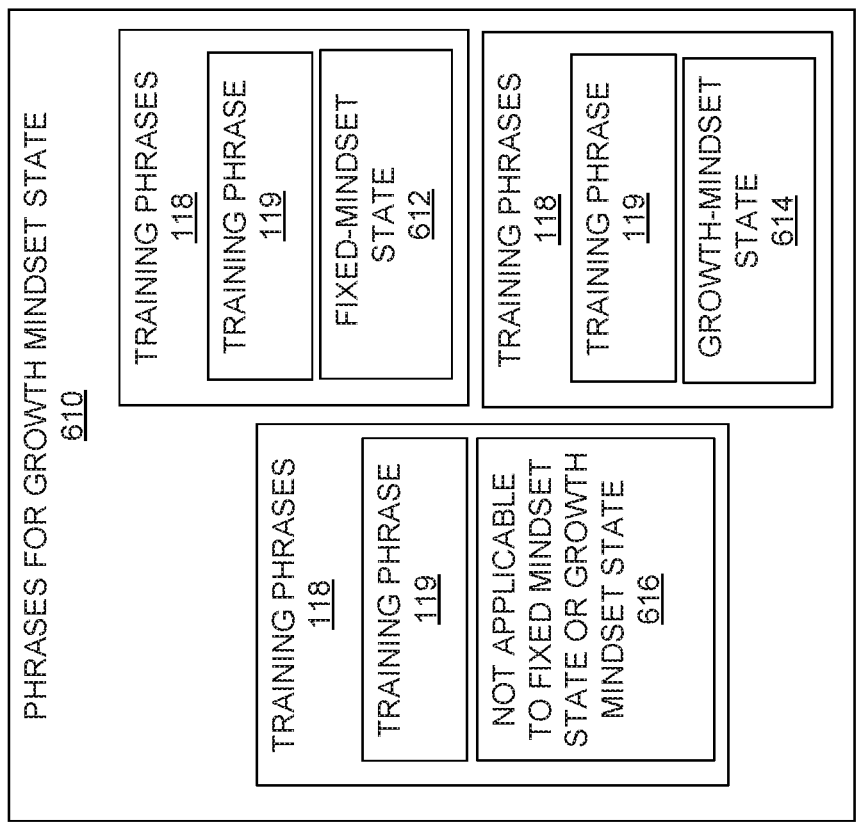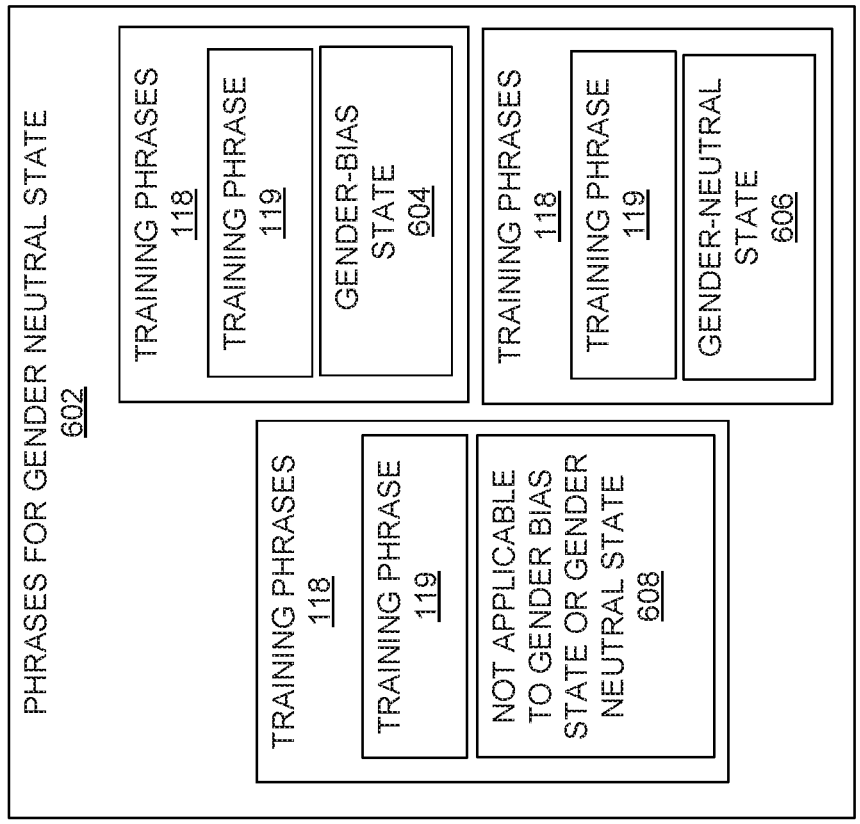
FIG. 6

```
{"luis_schema_version": "3.1.0", "versionId": "0.1", "name": "GrowthMindset",
"desc": "", "culture": "en-us", "intents": [ { "name": "FixedMindset"},
{"name": "GrowthMindset"}, {"name": "None"}], "entities": [], "composites":
[],"closedLists": [], "patternAnyEntities": [], "regex_entities": [], "prebuiltEntities": [],
"model_features": [ {"name": "skillsPhrase", "mode": true,
"words": "i am not,i'll never,i would never be,i never seem to,not good at,cannot do,i m
bad at it,cannot,can't,must,couldn't,won't,didn't,might,may,shall,never,shouldn't,need
to,always,is challenging,hate,cannot learn,cannot achieve,not possible,unable to,is
impossible,can not,incapable of,impossible to,is not possible",
"activated": true}, {"name": "habitPhrase", "mode": true,
"words": "makes me really,can be really,to shut people out,can't stop,usually off",
"activated": true}], "regex_features": [], "patterns": [], "utterances": [
{"text": "i am not good at this", "intent": "FixedMindset", "entities": []},
{"text": "i can learn to be a great software engineer","intent": "GrowthMindset",
"entities": []},
{"text": "i cannot be a great software engineer", "intent": "FixedMindset",
"entities": []},
{"text": "i didn't start with any singing talent", "intent": "GrowthMindset",
"entities": []},
{"text": "i feel really dissatisfied with all of the art i've tried to produce",
"intent": "GrowthMindset", "entities": []},
{"text": "i haven't learned how to do origami yet", "intent": "GrowthMindset",
"entities": [] },
{"text": "i leave office late hours", "intent": "None", "entities": [] },
702 ——▶ {"text": "i need to learn to solve that puzzle", "intent": "GrowthMindset",
"entities": []},
{"text": "i work here everyday", "intent": "None", "entities": []},
704 ——▶ {"text": "i'll never be an artist", "intent": "FixedMindset","entities": []},
{text": "i'm just bad at it, and i don't care", "intent": "FixedMindset",
"entities": []},
{"text": "i'm not good at origami", "intent": "FixedMindset", "entities": []},
{"text": "it is impossible","intent": "FixedMindset",
"entities": []},
{"text": "it's not a priority for me to learn right now", "intent": "GrowthMindset",
"entities": [] },
{"text": "math has been challenging for me", "intent": "GrowthMindset",
"entities": []},
{"text": "microsoft hackthon is going on","intent": "None",
"entities": []},
706 ——▶ {"text": "order food for the team", "intent": "None", "entities": [] },
{"text": "some people are born to be singers","intent": "FixedMindset",
"entities": [] },
{"text": "this is good enough", "intent": "FixedMindset", "entities": [] }
], "settings": [] }
```

FIG. 7

```
{"luis_schema_version": "3.1.0", "versionId": "0.1", "name": "Diversity&Inclusion",
                         "desc": "", "culture": "en-us",
  "intents": [ {"name": "GenderBias"}, {"name": "GenderNeutral"},{"name": "None"}],
     "entities": [], "composites": [], "closedLists": [], "patternAnyEntities": [],
           "regex_entities": [], "prebuiltEntities": [], "model_features": [
                        {"name": "ThirdPerson","mode": true,
 "words": "everyone his,everyone her,all his,all her,each his,each her,every his,every
    her,everybody his,everybody her,nurse her,nurse him,customers his,customers
                   her,employees his,employees her", "activated": true },
                      {"name": "Businessman", "mode": true, "words":
         "businessman,businesswoman,businesswomen,businessmen,chairman",
           "activated": true}], "regex_features": [], "patterns": [], "utterances": [
 {"text": "a nurse is trained to understand her patients' emotions as well as physical
                     symptoms", "intent": "GenderBias", "entities": []},
 {"text": "a young child is often influenced by the adverts and television commercials the
              child sees", "intent": "GenderNeutral", "entities": [] },
  {"text": "a young child is often persuaded by advertisements to buy what he sees on
                     television", "intent": "GenderBias", "entities": []},
{"text": "after the three-month probation period, a new employee can elect her medical
              and other benefits.", "intent": "GenderBias", "entities": []},
 { "text": "after the three-month probation period, a new employee can elect medical and
              other benefits", "intent": "GenderNeutral", "entities": []},
  {"text": "all members of our staff give their very best effort","intent": "GenderNeutral",
                                   "entities": []},
    {"text": "an employee should register her leave of absense", "intent": "GenderBias",
                                   "entities": []},
    {"text": "an employee should register his leave of absense", "intent": "GenderBias",
                                   "entities": []},
     {"text": "an employee should report any harrassment at work to her manager",
                      "intent": "GenderBias", "entities": []},
     {"text": "ask a firefighter for help, and he will get your kitten out of the tree",
                      "intent": "GenderBias", "entities": []},
 {"text": "ask a firefighter for help, and the firefighter will get your kitten out of the tree",
                     "intent": "GenderNeutral", "entities": []},
     {"text": "before leaving work each day, the secretary should write down his most
       important tasks to be completed the next day.", "intent": "GenderBias",
                                   "entities": []},
      {"text": "businessman is making a lot of money.", "intent": "GenderBias",
                                   "entities": []},
      {"text": "businessperson is making a lot of money", "intent": "GenderNeutral",
                                   "entities": []},
       { "text": "chairperson of the company will address the meeting", "intent":
                         "GenderNeutral","entities": [] },
```

CONTINUED FROM FIG. 8 ~⌣ 902

{"text": "constistution provides every individual with his or her rights to free speech", "intent": "GenderNeutral","entities": []},
{"text": "constistution provides every individual with his rights to free speech", "intent": "GenderBias","entities": []},
{"text": "constistution provides every individual with their rights to free speech", "intent": "GenderNeutral", "entities": [] },
{"text": "customers are happy to know about the discounts", "intent": "None", "entities": []},
{"text": "each employee should record daily the hours she spends on each project.", "intent": "GenderBias", "entities": [] },
{"text": "every businessman has to be smart", "intent": "GenderBias","entities": []},
{"text": "every candidate must carry his resume.", "intent": "GenderBias", "entities": []},
{"text": "every citizen should know her rights", "intent": "GenderBias", "entities": []},
{"text": "every doctor should carry her pager with her when she is on call.", "intent": "GenderBias", "entities": []},
{"text": "every kid should obey her parents", "intent": "GenderBias", "entities": []},
{"text": "every member of our staff gives her very best effort.", "intent": "GenderBias", "entities": []},
{"text": "every member of staff should give their best", "intent": "GenderNeutral", "entities": []},
{"text": "every person i talked to said he could come to the company party.", "intent": "GenderBias", "entities": []},
{"text": "everybody likes his or her job", "intent": "GenderNeutral", "entities": []},
{"text": "everyone should apply thier own ideas","intent": "GenderNeutral", "entities": []},
{"text": "everyone should bring his laptop to the meeting", "intent": "GenderBias", "entities": []},
{"text": "everyone should listen to her insticts", "intent": "GenderBias", "entities": []},
{"text": "he has done a good job.","intent": "None","entities": []},
{"text": "he is working on his project.","intent": "None","entities": []},
{"text": "it does not make any difference who you seek help from","intent": "None", "entities": []},
{"text": "jan is going to school to become a lady doctor.","intent": "GenderBias", "entities": []},
{"text": "law provides every individual with basic rights","intent": "GenderNeutral", "entities": []},
{"text": "law provides for every employee to have his basic rights at the workplace", "intent": "GenderBias", "entities": [] },

CONTINUED FROM FIG. 9 ⌇ 1002

{"text": "law provides for every employee to have their basic rights at the workplace", "intent": "GenderNeutral", "entities": []},
{"text": "let's order some food", "intent": "None", "entities": []},
{"text": "mark each potential donor's name off the list after you have talked to him or her", "intent": "GenderNeutral", "entities": []},
{"text": "mark each potential donor's name off the list after you have talked to him.", "intent": "GenderBias", "entities": []},
{"text": "nation pays tribute to the former primer minister", "intent": "None", "entities": []},
{"text": "nurses are trained to understand their patients' emotions as well as physical symptoms", "intent": "GenderNeutral", "entities": [] },
{"text": "pay attention to what they say", "intent": "None", "entities": []},
{"text": "people should abide by their principles","intent": "GenderNeutral", "entities": []},
{"text": "please remind everyone to bring his notepad and pen or laptop to the meeting.", "intent": "GenderBias","entities": []},
706 ⟶ {"text": "she has done a good job.", "intent": "None","entities": []},
{"text": "she is working on her projects", "intent": "None", "entities": []},
{"text": "the average teenager worries about his physical fitness", "intent": "GenderBias", "entities": [] },
{"text": "the average teenager worries about physical fitness", "intent": "GenderNeutral", "entities": [] },
{"text": "the parent who reads to her infant cares for her infant's intellectual growth", "intent": "GenderBias", "entities": [] },
{"text": "the parent, who cares about kids and pays attention to what they say, is an ideal parent", "intent": "GenderNeutral","entities": [] },
{ "text": "whenever you see your doctor, he will ask you few questions", "intent": "GenderBias","entities": []} ],"settings": [] }

FIG. 10

DETERMINING STATES OF CONTENT CHARACTERISTICS OF ELECTRONIC COMMUNICATIONS

TECHNICAL FIELD

Some embodiments relate to analyzing electronic communications. Some embodiments relate to evaluating content characteristics states (e.g., gender neutral or growth mindset) of real-time electronic messages based on natural language models and performing actions based on the evaluation of the content characteristic states, such as displaying the evaluations to a user to enable correction. Some embodiments relate to training natural language models for evaluating a content characteristic state. Some embodiments relate to providing a means for evaluating creating a new content characteristic state and evaluating the content characteristic.

BACKGROUND

Often users or employees of companies must write many electronic communications, e.g., using email or instant messaging. It may be difficult for employees to conform to corporate culture policies regarding the content of the electronic communications, e.g., gender neutral. Additionally, it may be difficult to evaluate the content of the electronic communications to give feedback to the users or employees prior to sending the electronic communication. Moreover, evaluating content characteristic states of electronic messages may be difficult as a spelling analysis or grammatical analysis is inadequate to determine the meaning of the electronic message in regard to a content characteristic state.

BRIEF DESCRIPTION OF THE DRAWINGS

The present disclosure is illustrated by way of example and not limitation in the figures of the accompanying drawings, in which like references indicate similar elements and in which:

FIG. 6 illustrates training phrases, in accordance with some embodiments;

FIG. 7 illustrates examples of phrases for growth-mindset state, in accordance with some embodiments;

FIGS. 8, 9, and 10 illustrate examples of phrases for growth-mindset state, in accordance with some embodiments;

DESCRIPTION

Figure 1:
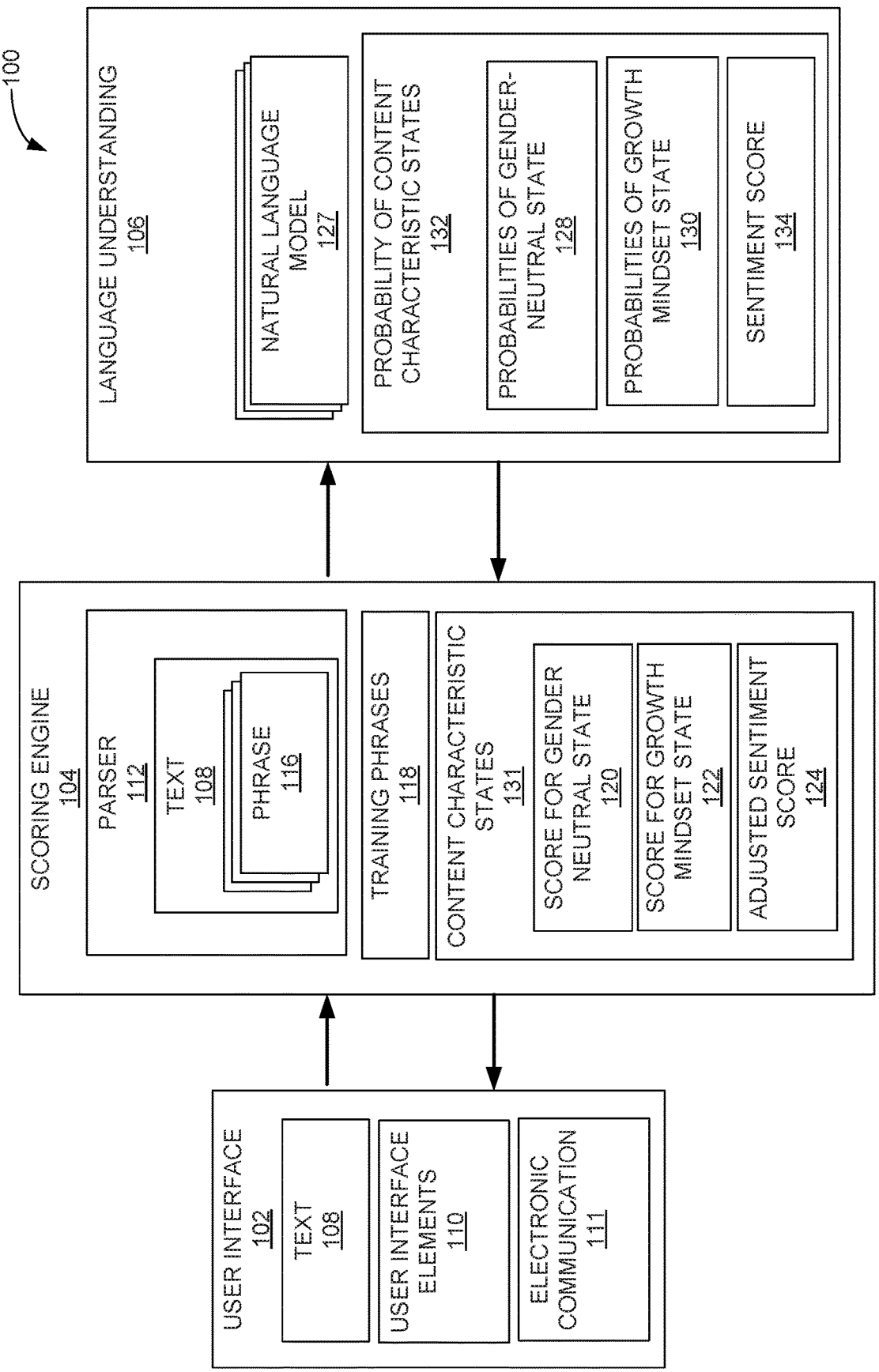
FIG. 1 illustrates a system for determining content characteristic states of electronic messages, in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some embodiments relate to determining a score for a content characteristic state of an electronic communication. The electronic communication (e.g., email, instant messages, etc.) may include text (e.g., sentences and phrases). The content characteristics may include gender-neutral (which may be termed diversity and inclusion), growth mindset, sentiment score, etc. The state of the content characteristic may be estimated by a score or probability.

Some embodiments provide a more accurate determination of the state of the content characteristic by training a natural language model using training phrases that provide three groups of training phrases, a positive state of the content characteristic (e.g., gender-neutral state), a negative state of the content characteristic (e.g., gender-bias state), and not applicable to the state of the content characteristic (e.g., not applicable to gender-neutral state or gender-bias state). The phrases may be text such as a natural language phrases or another communication item (e.g., an emoji) paired with a content characteristic state (e.g., the positive state, negative state, or not applicable to the positive state or the negative state).

For example, for training a natural language model for determining probabilities or scores for the gender-neutral state (a content characteristic state) of text, three sets of training phrases are provided including gender-bias state phrases, gender-neutral state phrases, and not applicable to gender-bias state or gender-neutral state phrases. In another example, for training a natural language model for determining probabilities for the growth-mindset state (a content characteristic state) of text, three sets of training phrases are provided including fixed mindset state phrases, growth-mindset state phrases, and not applicable to fixed mindset state or growth-mindset state phrases.

Training a natural language model with the three types of phrases provides a technical solution to determining probabilities of content characteristic states of an electronic communication. In some embodiments a separate natural language model is used for each of the three types of phrases. The probabilities of the three types of content characteristic states may be combined to determine a score for a content characteristic state (e.g., gender-neutral or growth mindset).

The score for a content characteristic state may be displayed to a user or author of the electronic communication prior to the electronic communication being sent. This may enable the user to edit the electronic communication to improve the score of the content characteristic state of the electronic communication. Displaying the score to the user many enable a user or employee to conform to policies for content characteristic states of electronic communications. For example, it may enable an employee to write electronic communications that are gender neutral and/or that have a growth mindset. Sending electronic communications that conform to appropriate content characteristic states may be as important as sending electronic communications that do not contain spelling mistakes or grammatical mistakes.

FIG. 1 illustrates a system 100 for determining states of content characteristic states of electronic communications, in accordance with some embodiments. Illustrated in FIG. 1 is user interface 102, scoring engine 104, and language understanding 106. Text 108 is sent from the user interface 102 to the scoring engine 104, which may parse the text 108 into phrases 116, and the scoring engine 104 sends the phrases 116 to language understanding 106. Language understanding 106 may determine based on the phrases 116 probability of content character states 132 using one or more natural language models 127.

Probability of content characteristic states 132 may include probabilities of diversity and inclusion (e.g., gender neutral state) state 128, probabilities of growth-mindset state 130, and sentiment score 134

Scoring engine 104 may receive one or more of probabilities of gender neutral state 128, probabilities of growth-mindset state 130, and sentiment score 134, and determine score for gender-neutral state 120, score for growth-mindset state 122, and an adjusted sentiment score 124. The user interface 102 may receive one or more of score for gender-neutral state 120, score for growth-mindset state 122, and an adjusted sentiment score 124. The user interface 102 may display (e.g., 314, 316, 318 of FIG. 3) one or more score for gender-neutral state 120 (this may be displayed as "diversity and inclusion score" for consumption by a user), score for growth-mindset state 122, and an adjusted sentiment score 124 to a user (not illustrated) for text 108 or a portion of the text 108.

The user interface 102 may include text 108, user interface elements 110, and electronic communication 111. FIG. 3 illustrates an example of a user interface 102. The user interface 102 may be part of an application (e.g., application 204 as described in conjunction with FIG. 2). The text 108 may be text that is entered or received by a user. The text 108 may be an electronic message. For example, the text 108 may be entered into an email or instant message program (e.g., application 204) for sending to other users. The text 108 may comprise phrases 116. The phrases 116 may be sentences. The text 108 and/or phrases 116 may comprise icons, emojis, videos, and other non-text elements that may be, for example, included in an email, word processing document, slide presentation document, or spreadsheet document. The user interface elements 110 may include interaction elements such as buttons, sliders, menus, text boxes, etc. For example, referring to FIG. 3, if a user selects the active culture 304 (a button) (FIG. 3), the user interface 102 will send text 108 to scoring engine 104 and display the results (e.g., 314, 316, and 318) on the user interface 300 (which may be displayed on a screen or presentation device of the user). The term active culture may refer to evaluating the content characteristic states of the text 108 within the context of the organization culture. Different terms may be used for active culture. The term active culture may be meant to remind or encourage the user to ensure that the electronic communication 111 will have acceptable content characteristic states, which may be similar to a spelling check or grammatical check of the text 108.

For example, the user may not be concerned about whether an email to a friend has a low score for growth-mindset state 122; however, the user may want to ensure that emails to colleagues have an acceptable score for growth-mindset state 122. The user interface 300 may be configured to enable a user to enter and edit text 108 and to send the text 108 to scoring engine 104 and display the results, e.g., score for gender neutral state 120, score for growth-mindset state 122, and adjusted sentiment score 124. The electronic communication 111 may be a communication where the text 108 is sent, e.g., an email that include the text 108 (for example if send 310 of FIG. 3 is selected). In some embodiments, one or more of the functions of scoring engine 104 and/or language understanding 106 may be performed by user interface 102. In some embodiments, one or more functions described herein may not be performed by user interface 102.

Scoring engine 104 may include parser 112, and training phrases 118, content characteristic states 131. Content characteristic states 131 may include score for gender neutral state 120, score for growth-mindset state 122, and adjusted sentiment score 124. The scoring engine 104 may receive text 108 from user interface 102. The parser 112 may take text 108 and parse the text 108 into phrases 116. The parser 112 may parse other non-text elements of the text 108 such as icons, emojis, etc. The scoring engine 104 may send one or more phrases 116 to language understanding 106. The training phrases 118 may be training phrases 118 as disclosed in conjunction with FIG. 6. For example, training phrases 118 may relate phrases (e.g., phrase 116) to a content characteristic state (e.g., gender bias state 604). The scoring engine 104 may send the training phrases 118 to language understanding 106 to train natural language models 127 (e.g., neural networks, regression models, etc.). The scoring engine 104 may send the text 108 to language understanding 106. Language understanding 106, which includes a natural language model 127, may return probability of content characteristic states 132.

Figure 5:
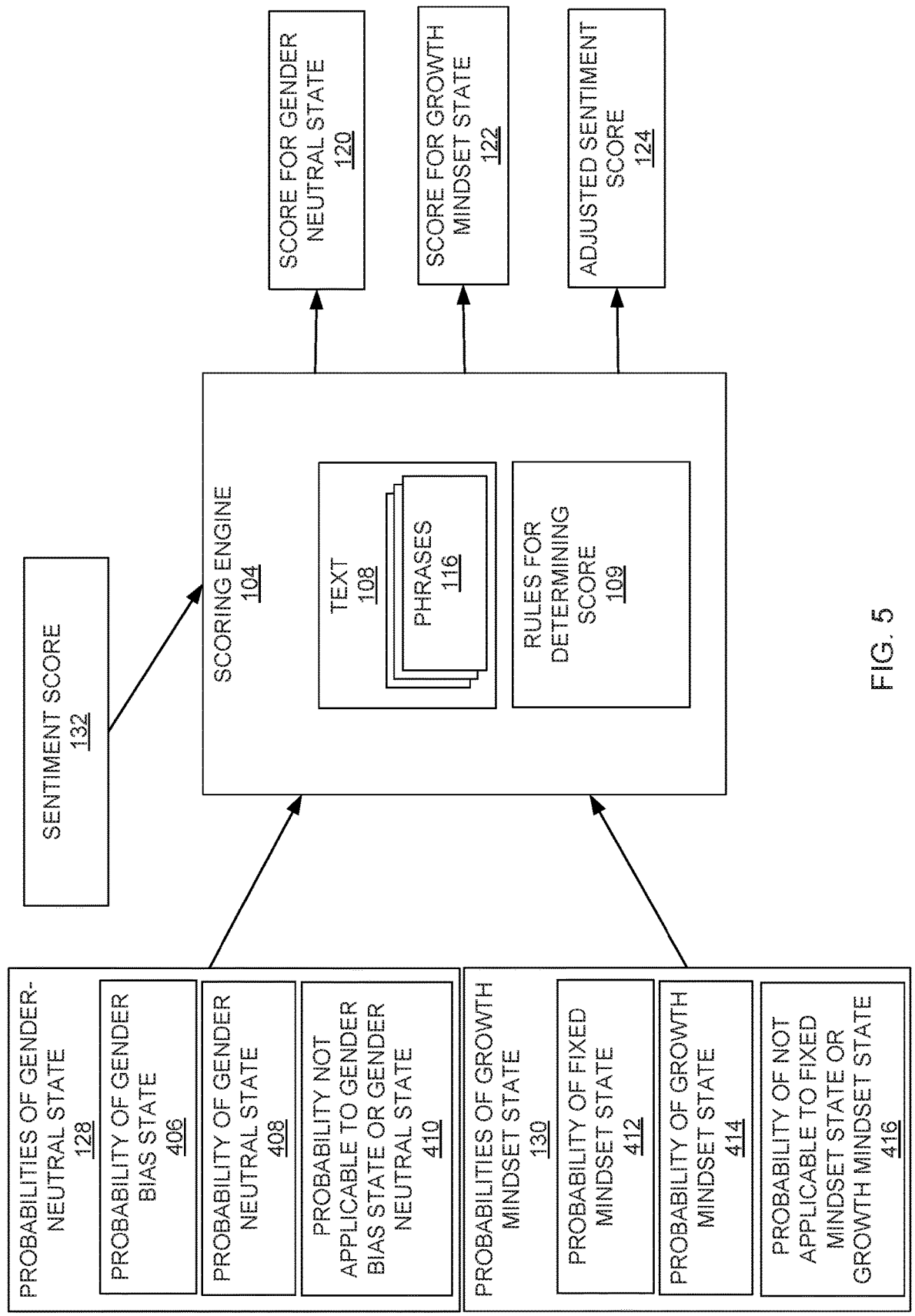
FIG. 5 illustrates a scoring engine, in accordance with some embodiments.

Scoring engine 104 may determine a score for gender-neutral state 120 based on probabilities of gender neutral state 128 as disclosed in conjunction with FIG. 5. Scoring engine 104 may determine score for growth-mindset state 122 based on probabilities of growth-mindset state 130 as disclosed in conjunction with FIG. 5. Scoring engine 104 may determine adjusted sentiment score 124 based on sentiment score 134 as disclosed in conjunction with FIG. 5. Scoring engine 104 may send one or more of score for gender-neutral state 120, score for growth-mindset state 122, and adjusted sentiment score 124 to user interface 102 in response to receiving text 108. In some embodiments, scoring engine 104 may perform one or more of the functions of user interface 102 and/or language understanding 106. In some embodiments, scoring engine 104 may perform fewer functions than described herein.

Language understanding 106 may include natural language model 127, probability of content characteristic states 132, which may include probabilities of gender-neutral state 128, probabilities of growth-mindset state 130, sentiment score 134. Language understanding 106 may receive text 108 and/or phrases 116 from scoring engine 104. Language understanding 106 may determine one or more of probabilities of gender-neutral state 128, probabilities of growth-mindset state 130, sentiment score 134 based on the text 108 or phrases 116 and natural language models 127, which are trained with training phrases 118. For example, natural language models 127 may use regression models or neural networks to determine probabilities of gender-neutral state 128, probabilities of growth-mindset state 130, sentiment score 134 based on the natural language models 127 as disclosed in conjunction with FIG. 4. Language understanding 106 may send one or more of probabilities of gender-neutral state 128, probabilities of growth-mindset state 130, sentiment score 134 to scoring engine 104. In some embodiments, language understanding 106 may perform one or more of the functions of user interface 102 and/or scoring engine 104. In some embodiments, language understanding 106 may perform fewer functions than described herein.

Figure 2:
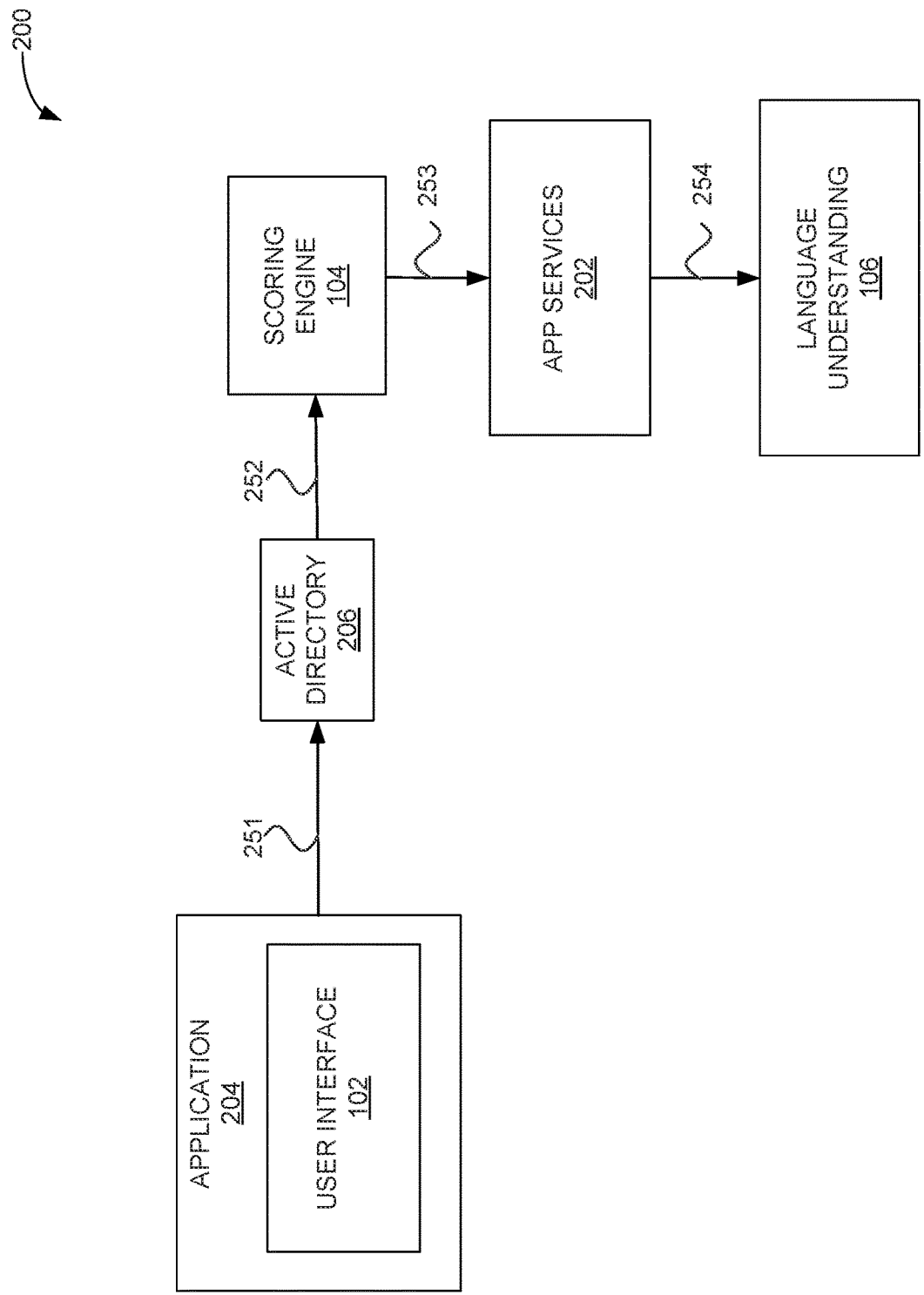
FIG. 2 illustrates a system determining content characteristic states of electronic messages, in accordance with some embodiments.
Figure 3:
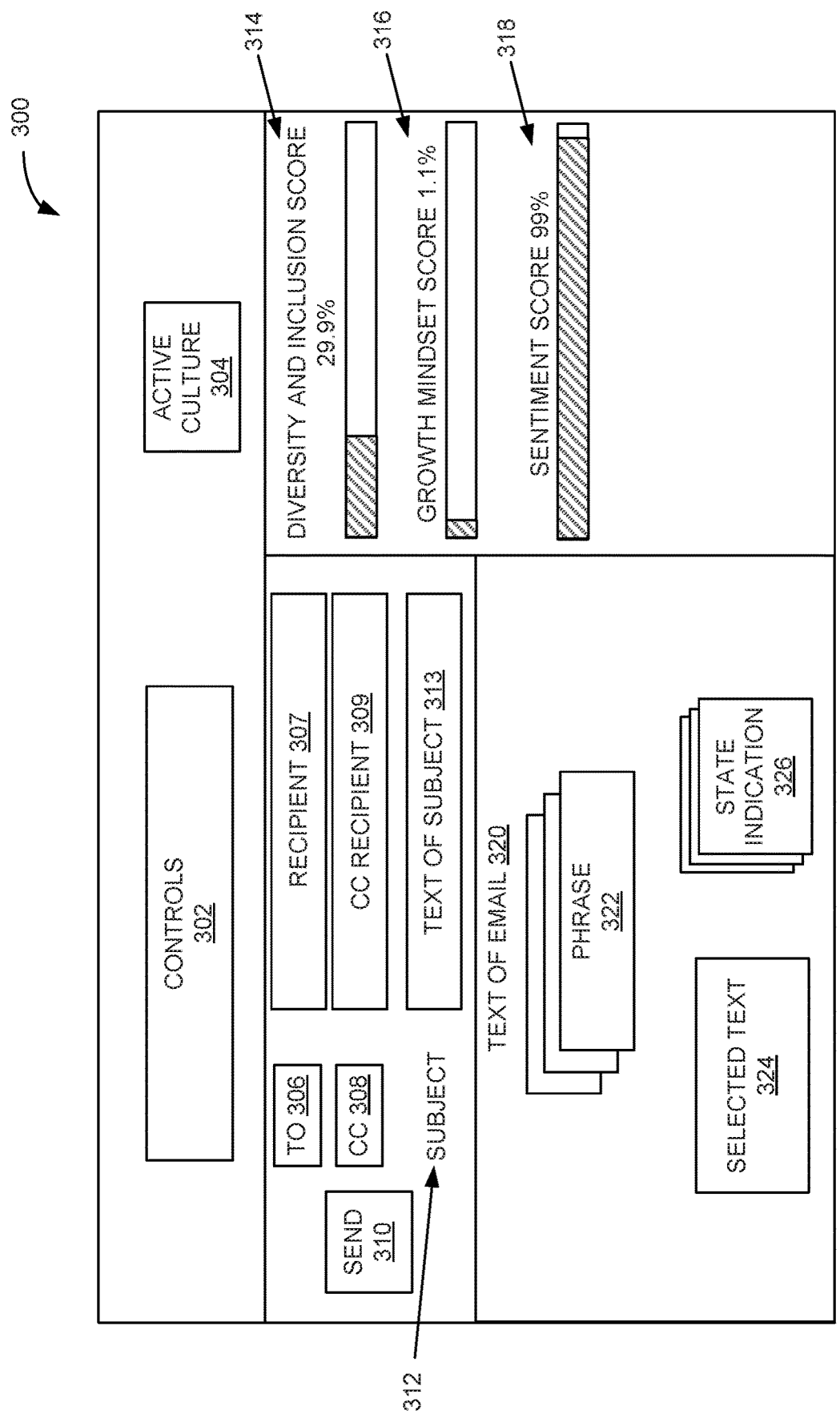
FIG. 3 illustrates a user interface, in accordance with some embodiments.

FIG. 2 illustrates a system 200 determining content characteristic states of electronic messages, in accordance with some embodiments. Illustrated in FIG. 2 is application 204, active directory 206, scoring engine 104, application (app)

services 202, language understanding 106, and links 251, 252, 253, 254. The application 204 may include user interface 102. The application 204 may be running on a computing device of a user (e.g., as described in conjunction with FIG. 12). The application 204 may be a web-based application, e.g., running within a browser (e.g., Internet Explorer®, Google Chrome®), running locally on a computing device, and/or an application 204 running locally in combination with some network portions. Example applications 204 include an email application (e.g., Outlook®), a word processing application (e.g., Word®), a slide presentation application (e.g., PowerPoint®), a spreadsheet application (e.g., Excel®), or another Microsoft Office® application. Additional examples include Skype®, Skype for Business®, Microsoft Teams®, Android Messenger®, Apple Mail®, etc.

The application 204 may access active directory 206 via link 251. The active directory 206 (e.g., Azure® Active Directory or Amazon Web Services® (AWS) Directory Service) may include application program interfaces to enable the application 204 to remotely call applications residing on remote servers. The links 251, 252, 253, and 254 may be a local link or a link over a network, e.g., the Internet or a local area network (LAN)(e.g., network 1226 as disclosed in conjunction with FIG. 12). The application 204 may use active directory 206 to send text 108 (e.g., in response to a request from the user interface 102) to scoring engine 104, in accordance with some embodiments. Scoring engine 104 may be an app that operates within a cloud-based application services framework (e.g., Azure® or Amazon Web Services®). Scoring engine 104 may return probability of content characteristic states 132 to application 204 or user interface 102 via link 252, which may pass through active directory 206 and link 251.

Scoring engine 104 may call language understanding 106 with one or more of text 108, sentence 116, and training utterances 118 via link 250.3. App services 202 may be server-based application services (e.g., Azure®). App services 202 may enable scoring engine 104 to call language understanding 106. App service 202 and language understanding 106 may be in communication via link 254. Language understanding 106 may send probability of content characteristic states 132 to scoring engine 104 via link 254, which may be via app services 202 and link 253. The links 251, 252, 253, and 254, application 204, active directory 206, scoring engine 104, app services 202, and language understanding 106 may be organized differently with different links 251, 252, 253, and 254, and with the functionality distributed differently. In some embodiments, one or more of application 204, active directory 206, scoring engine 104, app services 202, and language understanding 106 may be provided as a software as service.

FIG. 3 illustrates a user interface 300 in accordance with some embodiments. The user interface 300 may be the same or similar as user interface 102. User interface 300 may include controls 302, active culture 304, to 306, carbon copy ("cc") 308, send 310, subject 312, diversity and inclusion score 314, growth-mindset score 316, sentiment score 318, text of email 320, phrase 322, selected text 324, and state indication 326.

The user interface 300 may be for an application (e.g., 204) such as an email application. The controls 302 may be controls such as menus for saving, deleting, sending, receiving, changing the views, etc. Active culture 304 may be a button to invoke the scoring engine 104 to return one or more of score for diversity and inclusion 120, score for growth-mindset state 122, and adjusted sentiment score 124 for selected text 324. Active culture 304 may be a button that is activated by clicking or pressing on the button. Active culture 304 may be activated in other ways, e.g., by a keyboard short cut, a voice command, a menu item, etc. In some embodiments, active culture 304 may not need to be invoked for the scores 314, 316, 318 to be determined. For example, the user interface 300 may automatically determine the scores (e.g., 314, 316, 318) for selected text 324, or based on an event such as a sentence 322 or paragraph (not illustrated) being completed. To 306 indicates the recipient 307 of the email and CC 308 indicates a carbon copy recipient 309 of the email. In some embodiments, active culture 304 may have a different name or may be incorporated into other features such as a spell checker. The subject 312 indicates the text of subject 313. Diversity and inclusion score 314, growth-mindset score 316, and sentiment score 318 indicate the scores for text of email 320 or a portion of the text of email 320, e.g., phrase 322, selected text 324, and/or text of subject 313.

Text of email 320 may be the text of the email, which may be the same or similar as text 108. The text of email 320 may include the text of subject 313, recipient 307, and cc recipient 309. The selected text 324 may indicate a portion of the text of email 320 that is used for the scores (e.g., 314, 316, 318). The user (not illustrated) may select different text for the selected text 324, in accordance with some embodiments. In some embodiments, the selected text 324 may default to all the text of email 320. Phrase 322 may be the same or similar as phrase 116.

State indication 326 may be an indication of one or more of the scores (314, 316, 318), e.g., the state indication 326 may be turning a phrase 322 green to indicate a score above a threshold (e.g., 50%, 55%, 60%, etc.) for one or more of the scores 314, 316, 318. State indication 326 may be an indication of one or more of the scores (314, 316, 318), e.g., the state indication 326 may be turning a sentence 322 red or yellow to indicate a score below a threshold (e.g., 40%, 35%, 30%, etc.) for one or more of the scores 314, 316, 318.

State indication 326 may be an icon, e.g., a thumbs up after a sentence 322 to indicate a score above a threshold (e.g., 50%, 55%, 60%, etc.) for one or more of the scores 314, 316, 318. State indication 326 may be an icon, e.g., a thumbs down after a sentence 322 to indicate a score below a threshold (e.g., 30%, 25%, 200/%, etc.) for one or more of the scores 314, 316, 318. The state indication 326 may be another indication of one or more of the scores (e.g., 314, 316, 318).

The diversity and inclusion score 314 may be the same or similar as score for gender neutral state 120. Diversity and inclusion may be used as a label that may be more user friendly. The growth mindset score 316 may be the same or similar as score for growth-mindset state 122. The sentiment score 318 may be the same or similar as adjusted sentiment score 124. In some embodiments, a length of a bar indicates a score (e.g., 29.%, 1.1%, and 99%). The bar may be colored according to value of the score, e.g., green for above 60%, yellow for 40%-60%, and red for below 40%. Other thresholds may be used for determining the color of the bars.

One or more of diversity and inclusion score 314, growth mindset score 316, and sentiment score 318 may not be displayed or none of them may be displayed. The selected text 324 may be indicated by highlighting to dynamically indicate to the user which portion of the text of email 320 the scores (e.g., 314, 316, and 318) are applicable for. In some embodiments, the interface 300 may monitor the user entering phrases 322 and indicate a problem when a score (e.g., 314, 316, and 318) is below a threshold. For example, a user may enter "an employee should report any errors to her manager." This phrase may be indicated as a having a score below a threshold for diversity and inclusion score 314 because of the use of "her manager." As an example, the interface 300 may turn the phrase yellow or red, or the interface 300 highlight the sentence and indicate score 314, 316, or 318 for the phrase so that the user may identify the problem and correct it if desired.

In some embodiments, a different name may be used for one or more of diversity and inclusion score 314, growth mindset score 316, and sentiment score 318. For example, instead of "growth mindset score", growth mindset probability may be used. As another example, simply "mindset" or "willingness to learn" may be used for growth mindset score 316. Other names would be readily determined by those skilled in the art.

Figure 4:
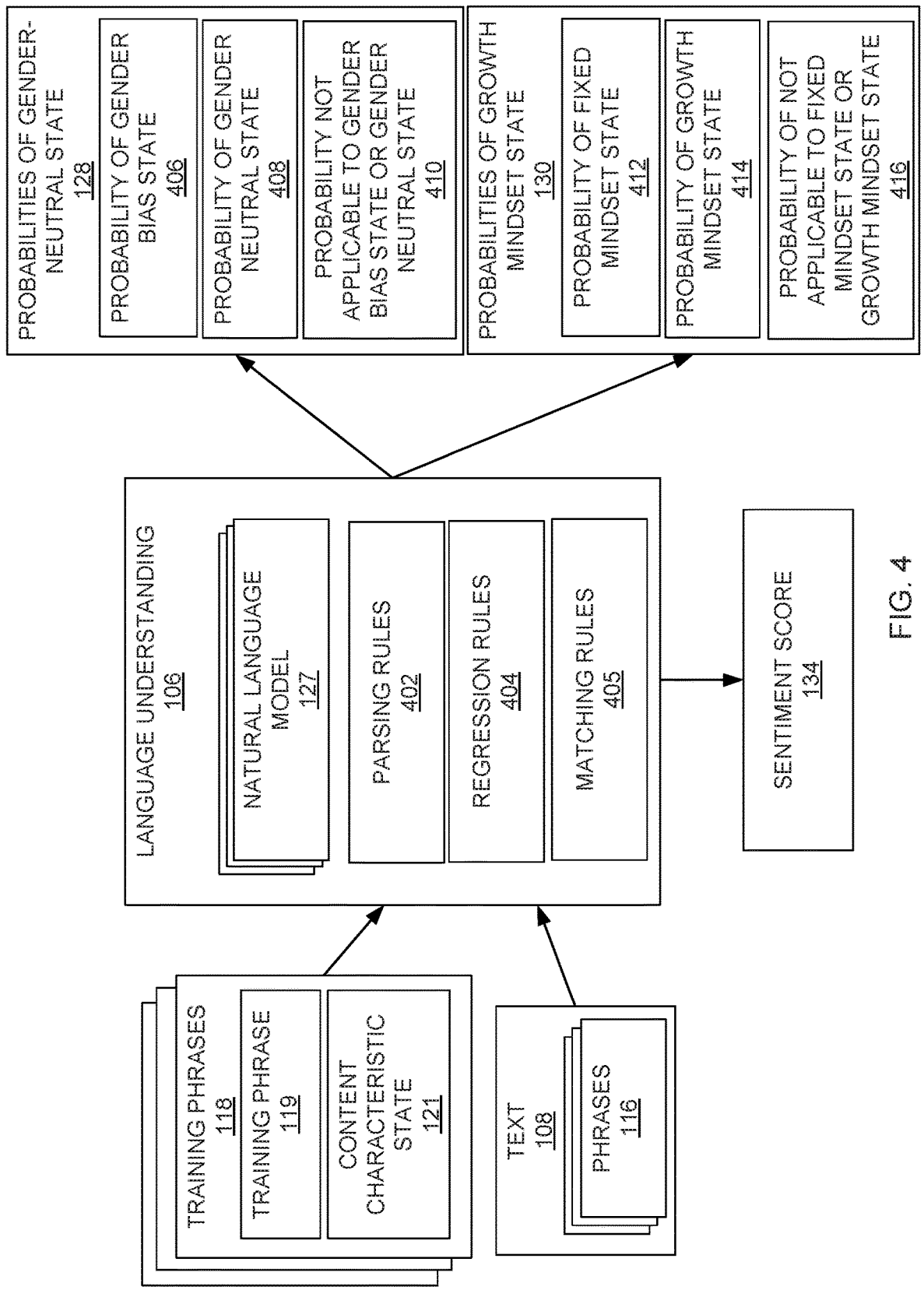
FIG. 4 illustrates language understanding, in accordance with some embodiments.

FIG. 4 illustrates language understanding 106 in accordance with some embodiments. Illustrated in FIG. 4 is training phrases 118, text 108, language understanding 106, sentiment score 134, probabilities of gender-neutral state 128, and probabilities for growth mindset state 130. Training phrases 118 may be the same or similar to training phrases 118 as disclosed in conjunction with FIGS. 1 and 6. Text 108 may be the same or similar to text 108, selected text 324, and text of email 320 as disclosed herein (e.g., FIGS. 1 and 3). Language understanding 106 may be the same or similar as language understanding 106 as disclosed herein (e.g., FIG. 1). Language understanding 106 may include natural language model 127, parsing rules 402, regression rules 404, and matching rules 405. Language understanding 106 may use training phrases 118 to train natural language model 127, e.g., natural language model 127 may be a neural network, a regression network or another structure. The parsing rules 402 may take text 108 or phrases 116 and parse the text 108 or phrases 116 appropriately for the natural language model 127.

Language understanding 106 may use the regression rules 404 and the training phrases 118 to train the natural language model 127. Language understanding 106 may use regression rules 404 to perform neural network simulation, regression, or another method with the text 108 or phrases 116 to determine the sentiment score 134, probabilities of gender-neutral state 128, and probabilities for growth mindset state 130.

Language understanding 106 determines probabilities of gender-neutral state 128, which may include a probability of gender-bias state 406, probability of gender-neutral state 408, and probability not applicable to gender-bias state or gender-neutral state 410.

Language understanding 106 determines probabilities of growth-mindset state 130, which may include a probability of fixed-mindset state 412, probability of growth-mindset state 414, and probability of not applicable to fixed-mindset state or growth-mindset state.

Language understanding 106 may determine the probabilities 406, 408, 410, 412, 414, and 416 based on the training phrases 118 and how well the text 108 or phrases 116 may be matched (or a similarity determined) to the training phrases 118 using neural networks, regression networks, or another structure.

The training phrases 118 may include training phrase 119 and content characteristic state 121 as disclosed in conjunction with FIG. 6. The training phrase 119 is indicated has having the content characteristic state 121. Language understanding 106 may train the natural language model 127 by feeding the training phrase 119 into a current natural language model 127 to receive a probability (406, 408, and 410; and 412, 414, and 416) for the training phrase 119. Language understanding 106 may then adjust weights (not illustrated) (e.g., using regression rules) to make the probabilities (406, 408, and 410; and 412, 414, and 416) agree or more closely agree with the content characteristic state 121. Language understanding 106 may repeat the process and feed the training phrases 118 repeatedly into the natural language model 127 to adjust weights so that the output of the natural language model 127 more closely agrees with the content characteristic state 121 coupled with the training phrase 119.

The matching rules 405 may be used by language understanding 106 to determine a probability and/or determine how well a phrases 116 matches with a natural language model 127. Matching rules 405 may include rules that enable language understanding 106 to match phrases 116 with the natural language model 127, e.g., rules that determine which portions of phrases 116 are proper nouns, rules that may skip portions of the phrases 116 such as prepositional phrases that may not be relevant to the natural language model 127, etc. In some embodiments, language understanding 106 maintains three natural language models 127 for each content characteristic state 121, e.g., gender-bias probability 406, gender-neutral probability 408, and probability not applicable to gender-bias state or gender-neutral state 410. Language understanding 106 may then identify the content characteristic state 121 as matching one of the three natural language models 127 (i.e. content characteristic state 121 is one of gender-neutral state, gender-bias state, or not applicable to gender-neutral state or gender-bias state). Language understanding 106 may then use training phrase 119 as a positive example for the natural language model 127 for the content characteristic state 121 and as a negative example for the other two natural language models 127.

In some embodiments, language understanding 106 may determine the probabilities (406, 408, and 410; and 412, 414, and 416) on a phrase-by-phrase basis where each phrase 116 is fed into a trained natural language model 127 network (e.g., neural network or regression network) and the probabilities (406, 408, and 410; and 412, 414, and 416) for the phrase 116 are determined based on the results of feeding the phrase 116 into the trained natural language model 127. In some embodiments, there may be separate trained natural language models 127 for each type of probability (406, 408, and 410; and 412, 414, and 416). The final probabilities (128, 130) returned to scoring engine 104 may be a composite score of the text 108.

Moreover, language understanding 106 may compare the three probabilities in each group (e.g., 406, 408, 410, and 412, 414, 416) to determine the probabilities for each member of the group. For example, if one probability (406, 408, 410, 412, 414, and 416) is higher than a threshold this may reduce the probability of the other two members of the group. Language understanding 106 may be configured to determine the probabilities (406, 408, 410, 412, 414, and 416) based on at least three probabilities in each group (e.g., illustrated is two groups with three members each: 406, 408, and 410; and 412, 414, and 416). In some embodiments, language understanding 106 may apply phrase 116 with each of three natural language models 127 to derive three probabilities (406, 408, and 410; and 412, 414, and 416) and select the highest probability of the three probabilities and set the other probabilities to zero. In some embodiments, language understanding 106 may adjust the scores of the probabilities (406, 408, and 410; and 412, 414, and 416) so that the sum of the probabilities of a group of three is not great than one, e.g., the probabilities (406, 408, and 410; and 412, 414, and 416) may be normalized.

Language understanding 106 may determine sentiment score 134 based training phrases 118 for different sentiments (not illustrated), which may be positive, negative, and not applicable. Language understanding 106 may send the probabilities 406, 408, 410, 412, 414, and 416 to scoring engine 104.

FIG. 5 illustrates scoring engine 104 in accordance with some embodiments. Illustrated in FIG. 5 is probabilities of gender-neutral state 128, probabilities of growth-mindset state 130, sentiment score 134, score for gender-neutral state 120, score for growth-mindset state 122, and adjusted sentiment score 124.

The scoring engine 104 may receive probabilities of gender-neutral state 128, which may be for one or more phrases 116, and determine score for gender-neutral state 120. The score for gender-neutral state 120 may be based on probability of gender-bias state 406, probability of gender-neutral state 408, and probability not applicable to gender-bias state or gender-neutral state 410.

Rules for determining score 109 may include one or more rules for determining a score (e.g., 120, 122, or 124). In an example rule, scoring engine 104 may determine the score for gender-neutral state 120 based on a proportion of the positive probability (e.g., probability of gender-neutral state 408), e.g., probability of gender-neutral state 408 divided by the addition of probability of gender-bias state 406, probability of gender-neutral state 408, and probability not applicable to gender-bias state or gender-neutral state 410.

The scoring engine 104 may receive intent probabilities of growth mindset state 130, which may be for one or more sentences 116, and determine score for growth mindset state 122. The score for growth mindset state 122 may be based on probability of fixed-mindset state 412, probability of growth-mindset state 414, and probability of not applicable to fixed-mindset state or growth-mindset state 416. Scoring engine 104 may use a rule of rules for determining score 109 to determine the score of score for growth mindset state 122. For example, scoring engine 104 may determine score for growth mindset state 122 based on a proportion of the positive probability (e.g., probability of growth mindset state 414), e.g., probability of growth mindset state 414 divided by the sum of probability of fixed-mindset state 412, probability of growth-mindset state 414, and probability of not applicable to fixed-mindset state or growth-mindset state 416.

The scoring engine 104 may determine adjusted sentiment score 124 based on sentiment score 134 and rules for determining score 109. For example, the scoring engine 104 use a rule of rules for determining score 109 to reduce the sentiment score 134 if the score for gender-neutral state 120 and/or the score for growth-mindset state 122 are below a threshold (e.g., 60%). In another example, the scoring engine 104 may increase the sentiment score 134 if the score for gender neutral state 120 and/or the score for growth-mindset state 122 are above another threshold (e.g., 80%).

FIG. 6 illustrates training phrases 118, in accordance with some embodiments. Training phrases 118 may be a data structure (e.g., schema that may include phrases coupled with content characteristic state 121). Illustrated in FIG. 6 is phrases for gender neutral state 602 and phrases for growth mindset state 610.

Phrases for gender neutral state 602 includes training phrases 118 coupled with gender-biased state 604, gender-neutral state 606, and not applicable to gender-bias state or gender-neutral state 608. Phrases for gender-neutral state 602 may be used to train three natural language models 127, in accordance with some embodiments.

Phrases for growth-mindset state 610 includes training phrases 118 coupled with fixed-mindset state 612, growth-mindset state 614, and not applicable to fixed-mindset state or growth-mindset state 616. Phrases for growth-mindset state 610 may be used to train three natural language models 127, in accordance with some embodiments.

FIG. 7 illustrates examples of phrases for growth-mindset state 700, in accordance with some embodiments. The phrases for growth mindset state 700 may be a script for language understanding 106 to use to train natural language models 127. FIG. 7 may be a data structure such as a schema. A training phrase 118 with a growth-mindset state 614 is illustrated at data structure 702, "{'text': 'i need to learn to solve that puzzle', 'intent': 'GrowthMindset', 'entities': [ ]}". The "text" indicates that the utterance is text. The phrase (note that utterance is used in phrases for growth-mindset state 700 rather than phrases) is "i need to learn to solve that puzzle." An utterance may be the same or similar as a phrase. Intent may indicate the content characteristic state 121. The content characteristic state 121 is "Growth-Mindset" (growth-mindset state 614). And, "entities" is an indication for the script. Phrases 116 that were matched with this phrase would have a higher probability for growth-mindset state 614.

A training phrase 118 with a fixed-mindset state 612 is illustrated at data structure 704, "{'text': 'i'll never be an artist', 'intent': 'FixedMindset','entities': [ ]}". The "text" indicates that the phrase is text. The phrase is "i'll never be an artist." The content characteristic state 121 is "Fixed-Mindset" (i.e., fixed-mindset state 612). And, "entities" is an indication for the script. Phrases 116 that were matched with this phrase would have a higher probability for a fixed-mindset state 612.

A training phrase 118 coupled with not applicable to fixed-mindset state or growth-mindset state 616 (e.g., not applicable) is illustrated at date structure 706 "{'text': 'order food for the team', 'intent': 'None', 'entities': [ ] }". The "text" indicates that the phrase is text. The phrase is "order food for the team." The intent is "None" (e.g. not applicable to fixed-mindset state or growth-mindset state 616). And, "entities" is an indication for the script. Phrases 116 that were matched with this phrase would have a higher probability for not applicable to fixed-mindset state or growth-mindset state 616.

FIGS. 8, 9, and 10 illustrate examples of phrases for gender neutral state 800, in accordance with some embodiments. The phrases for gender neutral state 800 may be a script for language understanding 106 to use to train natural language models 127. FIGS. 8, 9, and 10 may be a data structure, e.g., a schema. FIG. 8 is continued at FIG. 9 802. FIG. 9 is continued from FIG. 8 902 and is continued at FIG. 10 904. FIG. 10 is continued from FIG. 9 1002.

A training phase 118 coupled with a gender-neutral state 606 is illustrated at date structure 802, "{('text': 'all members of our staff give their very best effort','intent': 'GenderNeutral', 'entities': [ ]}". The "text" indicates that the phrase is text. The phrase is "all members of our staff give their very best effort." The intent is "GenderNeutral", i.e., gender-neutral state 606. And, "entities" is an indication for the script. Phrases 116 that were matched with this phrase would have a higher probability for gender-neutral state 606.

A training phrase 118 coupled with a gender-bias state 604 is illustrated at date structure 804, "('text': 'every citizen should know her rights', 'intent': 'GenderBias', 'entities': [ ])". The "text" indicates that the utterance is text. The phrase is "every citizen should know her rights." The intent is "GenderBias", i.e., gender-bias state 604. And, "entities" is an indication for the script. Phrases 116 that were matched with this phrase would have a higher probability for gender-bias state 604.

A training phrase 118 coupled with not applicable to gender bias state or gender-neutral state 608 is illustrated at date structure 806, "{'text': 'she has done a good job.', 'intent': 'None', 'entities': [ ]}". The "text" indicates that the utterance is text. The phrase is "she has done a good job." The intent is "None", i.e., not applicable to gender bias or gender-neutral state 608. And, "entities" is an indication for the script. Phrases 116 that were matched with this phrase would have a higher probability for not applicable to gender bias state or gender-neutral state 608. In some embodiments, more training phrases 118 are used than are illustrated in FIGS. 7, 8, 9, and 10.

Figure 11:
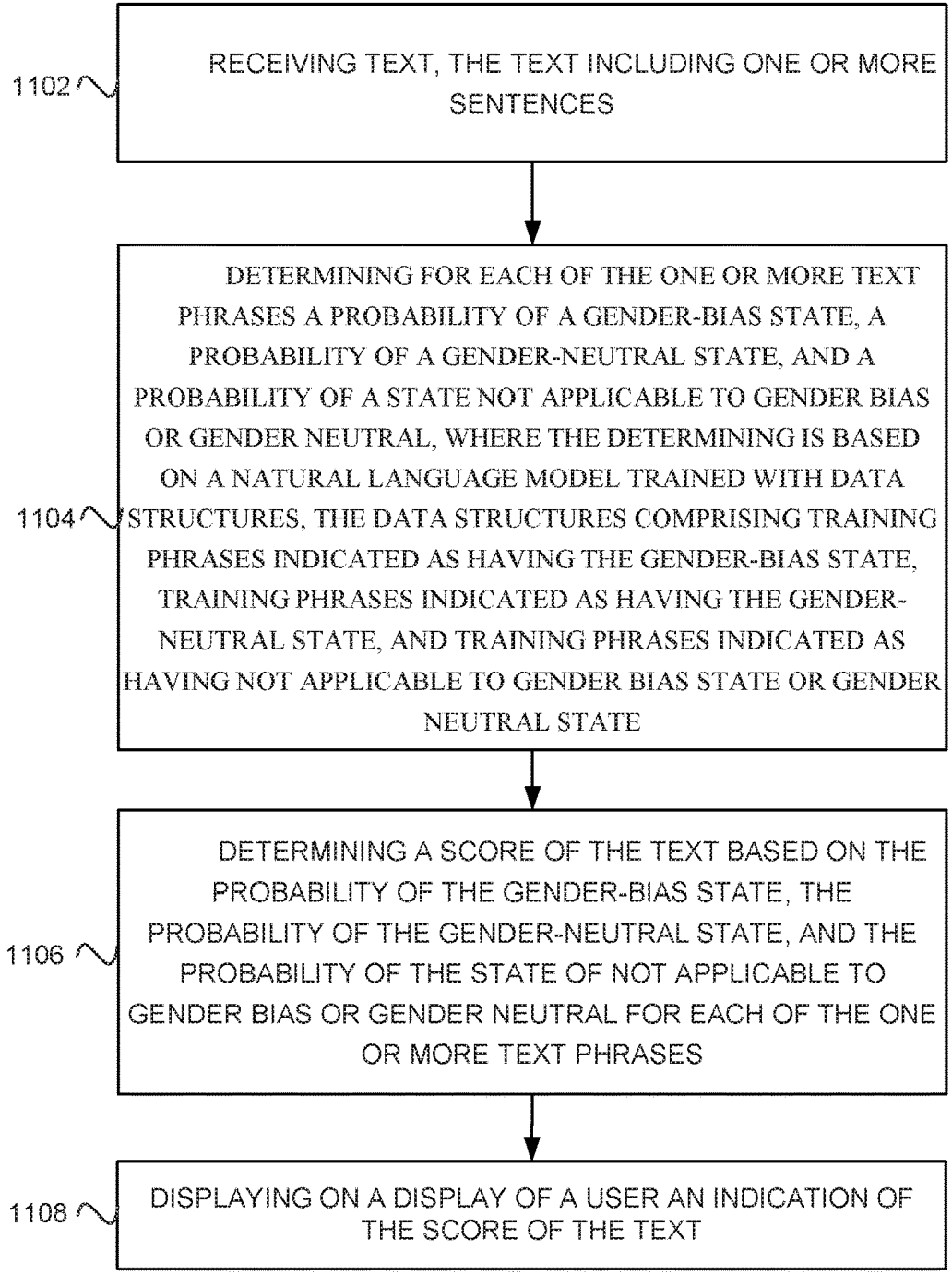
FIG. 11 illustrates a method for determining states of content characteristics of electronic communications, in accordance with some embodiments.

FIG. 11 illustrates a method 1100 for determining states of content characteristics of electronic communications, in accordance with some embodiments. The method 1100 begins at operation 1102 with receiving text, where the text includes one or more sentences. For example, user interface 102 may receive text 108. In another example, the application 204 may receive text 108 via the user interface 102. In another example, user interface 300 may receive text of email 320. In another example, language understanding 106 may receive text 108.

The method 1100 may continue at operation 1106 with determining for each of the one or more text phrases a probability of a gender-bias state, a probability of a gender-neutral state, and a probability of a state not applicable to gender bias or gender neutral, where the determining is based on a natural language model trained with data structures, the data structures comprising training phrases indicated as having the gender-bias state, training phrases indicated as having the gender-neutral state, and training phrases indicated as having not applicable to gender bias state or gender neutral state.

For example, language understanding 106 may determine probability of gender-bias state 406, probability of gender-neutral state 408, and probability not applicable to gender-bias state or gender-neutral state 410. The probabilities 406, 408, and 410 may be for a phrase 116 or one or more phrases 116. The probabilities 406, 408, 410 may be determined using natural language models 127 that were trained with training phrases 118, e.g., training phrases 118 for gender-bias state 604, gender-neutral state 606, and not applicable to gender-bias state or gender-neutral state 608.

The method 1100 may continue at operation 1108 with determining a score of the text based on the probability of the gender-bias state, the probability of the gender-neutral state, and the probability of the state of not applicable to gender bias or gender neutral for each of the one or more text phrases.

For example, scoring engine 104 may determine a score for gender-neutral state 120 based on probability of gender-bias state 406, probability of gender-neutral state 408, and probability not applicable to gender-bias state or gender-neutral state 410.

The method 1100 may continue at operation 1110 with displaying on a display of a user the score of the text. For example, user interface 102 and/or application 204 may cause output on a display (not illustrated) for a user (not illustrated) the score for gender-neutral state 120. In another example, user interface 300 may display diversity and inclusion score 314 on a display (the display the interface 300 is being displayed on) for a user.

The method 1100 may optionally include the operation (not illustrated) of parsing text into one or more phrases. The operation may be performed as disclosed in one of the following examples. User interface 102 may parse the text 108. Parser 112 may parse the text 108 into phrases 116. Scoring engine 104 may parse the text 108 into phrases 116. Language understanding 106 may parse the text 108 into phrases 116. User interface 300 may parse text of email 320 (e.g., selected text 324) into phrases 322.

One or more of the operations of method 1100 may be optional. In some embodiments, the order of the operations may be different. Method 1100 may be performed by one or more of user interface 102, scoring engine 104, language understanding 106, application 204, user interface 300, or another computer entity.

Figure 12:
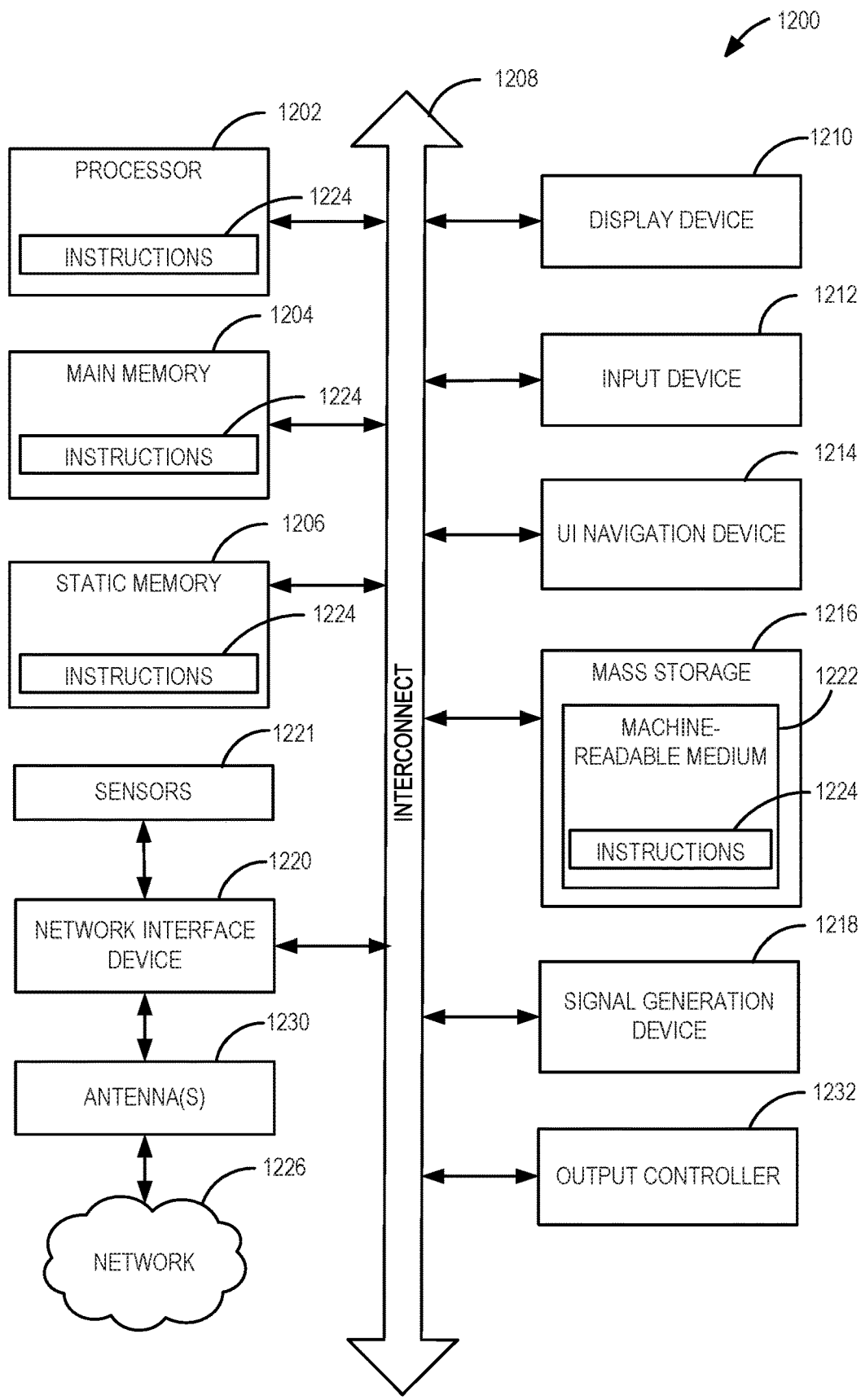
FIG. 12 illustrates a block diagram of an example machine upon which any one or more of the techniques (e.g., methodologies) discussed herein may perform.

FIG. 12 illustrates a block diagram of an example machine 1200 upon which any one or more of the techniques (e.g., methodologies) discussed herein may perform. In alternative embodiments, the machine 1200 may operate as a standalone device or may be connected (e.g., networked) to other machines. In a networked deployment, the machine 1200 may operate in the capacity of a server machine, a client machine, or both in server-client network environments. In an example, the machine 1200 may act as a peer machine in peer-to-peer (P2P) (or other distributed) network environment. The machine 1200 may be a server, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 1200 may include a hardware processor 1202 (e.g., a central processing unit (CPU), a graphics processing unit (GPU), a hardware processor core, or any combination thereof), a main memory 1204 and a static memory 1206, some or all of which may communicate with each other via an interlink (e.g., bus) 1208.

Specific examples of main memory 1204 include Random Access Memory (RAM), and semiconductor memory devices, which may include, in some embodiments, storage locations in semiconductors such as registers. Specific examples of static memory 1206 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 1200 may further include a display device 1210, an input device 1212 (e.g., a keyboard), and a user interface (UI) navigation device 1214 (e.g., a mouse). In an example, the display device 1210, input device 1212 and UI navigation device 1214 may be a touch screen display. The machine 1200 may additionally include a mass storage (e.g., drive unit) 1216, a signal generation device 1218 (e.g., a speaker), a network interface device 1220, and one or more sensors 1221, such as a global positioning system (GPS) sensor, compass, accelerometer, or other sensor. The machine 1200 may include an output controller 1232, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 1202 and/or instructions 1224 may comprise processing circuitry and/or transceiver circuitry.

The storage device 1216 may include a machine readable medium 1222 on which is stored one or more sets of data structures or instructions 1224 (e.g., software) embodying or utilized by any one or more of the techniques or functions described herein. For example, one or more of user interface 102, user interface 300, application 204, active directory 206, scoring engine 104, application server 202, and language understanding 106 may be implemented by machine 1200 to form a special purpose machine 1200. The instructions 1224 may also reside, completely or at least partially, within the main memory 1204, within static memory 1206, or within the hardware processor 1202 during execution thereof by the machine 1200. In an example, one or any combination of the hardware processor 1202, the main memory 1204, the static memory 1206, or the storage device 1216 may constitute machine-readable media. Example machine-readable medium may include non-transitory machine-readable medium that may include tangible non-transitory medium for storing information in a form readable by one or more computers, such as but not limited to read only memory (ROM); random access memory (RAM); magnetic disk storage media; optical storage media; a flash memory, etc.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 1222 is illustrated as a single medium, the term "machine readable medium" may include a single medium or multiple media (e.g., a centralized or distributed database, and/or associated caches and servers) configured to store the one or more instructions 1224.

The instructions 1224 may further be transmitted or received over a communications network 1226 using a transmission medium via the network interface device 1220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, Licensed Assisted Access (LAA), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 1220 may include one or more physical jacks (e.g., Ethernet, coaxial, or phone jacks) or one or more antennas to connect to the communications network 1226. In an example, the network interface device 1220 may include one or more antennas 1230 to wirelessly communicate using at least one of single-input multiple-output (SIMO), multiple-input multiple-output (MIMO), or multiple-input single-output (MISO) techniques. In some examples, the network interface device 1220 may wirelessly communicate using Multiple User MIMO techniques. The term "transmission medium" shall be taken to include any intangible medium that is capable of storing, encoding or carrying instructions for execution by the machine 1200, and includes digital or analog communications signals or other intangible medium to facilitate communication of such software.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

What is claimed is:

1. A computer-implemented method, the method comprising:
   receiving text, the text comprising one or more text phrases;
   determining for each of the one or more text phrases a probability of a gender-bias state, a probability of a gender-neutral state, and a probability of a state of not applicable to gender bias or gender neutral, the determining being based on a natural language model trained with data structures, the data structures comprising training phrases indicated as having the gender-bias state, training phrases indicated as having the gender-neutral state, and training phrases indicated as not applicable to the gender-bias state or the gender-neutral state;
   determining a score of the text based on the probability of the gender-bias state, the probability of the gender-neutral state, and the probability of the state of not applicable to gender bias or gender neutral for each of the one or more text phrases; and
   causing to be displayed on a display of a user an indication of the score of the text.

2. The computer-implemented method of claim 1, wherein the text is received from an email application and the score is displayed on a user interface of the email application.

3. The computer-implemented method of claim 1, further comprising:
   training the natural language model with the data structures, the data structures comprising the training phrases indicated as having the gender-bias state, the training phrases indicated as having the gender-neutral state, and the training phrases indicated as not applicable to the gender-bias state or the gender-neutral state, wherein the natural language model is a neural network or regression network.

4. The computer-implemented method of claim 1, wherein the natural language model is a neural network or regression network, and wherein the computer-implemented method further comprises:
   training a first neural network or a first regression network with the training phrases indicated as having the gender-bias state;
   training a second neural network or a second regression network with the training phrases indicated as having the gender-neutral state; and
   training a third neural network or a third regression network with the training phrases indicated as not applicable to the gender-bias state or the gender-neutral state.

5. The computer-implemented method of claim 4, further comprising:
   determining for each of the one or more text phrases the probability of the gender-bias state based on a first matching score of a corresponding text phrase of the one or more text phrases with the first neural network;
   determining for each of the one or more text phrases the probability of the gender-neutral state based on a second matching of the corresponding text phrase of the one or more text phrases with the second neural network; and
   determining for each of the one or more text phrases the probability of the state of not applicable to gender bias or gender neutral state based on a third matching score of the corresponding text phrase of the one or more text phrases with the third neural network.

6. The computer-implemented method of claim 1, further comprising:
   determining a sentiment score of the text;
   determining an adjusted sentiment score of the text based on the sentiment score of the text and the score of the text; and
   causing to be displayed on the display of the user an indication of the adjusted sentiment score.

7. The computer-implemented method of claim 1, further comprising:
   determining for each of the one or more text phrases a probability of a fixed mindset state, a probability of a growth mindset state, and a probability of a state of not applicable to fixed mindset or growth mindset, wherein the determining is based on a natural language model trained with second data structures, the second data structures comprising training phrases indicated as having the fixed mindset state, training phrases indicated as having the growth mindset state, and training phrases indicated as not applicable to the fixed mindset state or the growth mindset state;
   determining another score of the text based on a probability of the fixed mindset state, a probability of the growth mindset state, and a probability of the state of not applicable to fixed mindset or growth mindset; and
   causing to be displayed on the display of the user an indication of the another score of the text.

8. The computer-implemented method of claim 1, further comprising:
   determining the score of the text based on the probability of the gender-bias state, the probability of the gender-neutral state, and the probability of the state of not applicable to gender bias or gender neutral for each of the one or more text phrases, wherein the probability of the gender-bias state is weighted to account more for the score than the probability of the gender-neutral state and the probability of the state of not applicable to gender bias or gender neutral.

9. A non-transitory computer-readable storage medium that stores instructions that when executed by one or more processors of a computing device, cause the one or more processors to perform operations comprising:
   receiving text, the text comprising one or more text phrases;
   determining for each of the one or more text phrases a probability of a gender-bias state, a probability of a gender-neutral state, and a probability of a state of not applicable to gender bias or gender neutral, the determining being based on a natural language model trained with data structures, the data structures comprising training phrases indicated as having the gender-bias state, training phrases indicated as having the gender-neutral state, and training phrases indicated as not applicable to the gender-bias state or the gender-neutral state;
   determining a score of the text based on the probability of the gender-bias state, the probability of the gender-neutral state, and the probability of the state of not applicable to gender bias or gender neutral for each of the one or more text phrases; and
   causing to be displayed on a display of a user an indication of the score of the text.

10. The computer-readable storage medium of claim 9, wherein the text is received from an email application and the score is displayed on a user interface of the email application.

11. The computer-readable storage medium of claim 10, wherein the operations further comprise:
    training the natural language model with the data structures, the data structures comprising the training phrases indicated as having the gender-bias state, the training phrases indicated as having the gender-neutral state, and the training phrases indicated as not applicable to the gender-bias state or the gender-neutral state, wherein the natural language model is a neural network or regression network.

12. The computer-readable storage medium of claim 9, wherein the natural language model is a neural network or regression network, and wherein the operations further comprise:
    training a first neural network or a first regression network with the training phrases indicated as having the gender-bias state;
    training a second neural network or a second regression network with the training phrases indicated as having the gender-neutral state; and
    training a third neural network or a third regression network with the training phrases indicated as not applicable to the gender-bias state or the gender-neutral state.

13. The computer-readable storage medium of claim 12, wherein the operations further comprise:
    determining for each of the one or more text phrases the probability of the gender-bias state based on a first matching score of a corresponding text phrase of the one or more text phrases with the first neural network;

determining for each of the one or more text phrases the probability of the gender-neutral state based on a second matching of the corresponding text phrase of the one or more text phrases with the second neural network; and determining for each of the one or more text phrases the probability of the state of not applicable to gender bias or gender neutral based on a third matching score of the corresponding text phrase of the one or more text phrases with the third neural network.

14. The computer-readable storage medium of claim 9, wherein the operations further comprise:

determining for each of the one or more text phrases a probability of a fixed mindset state, a probability of a growth mindset state, and a probability of a state of not applicable to fixed mindset or growth mindset, wherein the determining is based on a natural language model trained with second data structures, the second data structures comprising training phrases indicated as having the fixed mindset state, training phrases indicated as having the growth mindset state, and training phrases indicated as not applicable to the fixed mindset state or the growth mindset state;

determining another score of the text based on a probability of the fixed mindset state, a probability of the growth mindset state, and a probability of the state of not applicable to fixed mindset or growth mindset; and causing to be displayed on the display of the user an indication of the another score of the text.

15. A computing device comprising:

a processor;

a memory, comprising instructions which, when executed by the processor, cause the processor to perform operations comprising:

receiving text, the text comprising one or more text phrases;

determining for each of the one or more text phrases a probability of a gender-bias state, a probability of a gender-neutral state, and a probability of a state of not applicable to gender bias or gender neutral, the determining being based on a natural language model trained with data structures, the data structures comprising training phrases indicated as having the gender-bias state, training phrases indicated as having the gender-neutral state, and training phrases indicated as not applicable to the gender-bias state or the gender-neutral state;

determining a score of the text based on the probability of the gender-bias state, the probability of the gender-neutral state, and the probability of the state of not applicable to gender bias or gender neutral for each of the one or more text phrases; and causing to be displayed on a display of a user an indication of the score of the text.

16. The computing device of claim 15, wherein the text is received from an email application and the score is displayed on a user interface of the email application.

17. The computing device of claim 16, wherein the operations further comprise:

training the natural language model with the data structures, the data structures comprising the training phrases indicated as having the gender-bias state, the training phrases indicated as having the gender-neutral state, and the training phrases indicated as not applicable to the gender-bias state or the gender-neutral state, wherein the natural language model is a neural network or regression network.

18. The computing device of claim 15, wherein the operations further comprise:

training a first neural network or a first regression network with the training phrases indicated as having the gender-bias state;

training a second neural network or a second regression network with the training phrases indicated as having the gender-neutral state; and training a third neural network or a third regression network with the training phrases indicated as not applicable to the gender-bias state or the gender-neutral state.

19. The computing device of claim 15, wherein the operations further comprise:

determining for each of the one or more text phrases the probability of the gender-bias state based on a first matching score of a corresponding text phrase of the one or more text phrases with the first neural network;

determining for each of the one or more text phrases the probability of the gender-neutral state based on a second matching of the corresponding text phrase of the one or more text phrases with the second neural network; and determining for each of the one or more text phrases the probability of the state of not applicable to gender bias or gender neutral based on a third matching score of the corresponding text phrase of the one or more text phrases with the third neural network.

20. The computing device of claim 15, wherein the operations further comprise:

determining for each of the one or more text phrases a probability of a fixed mindset state, a probability of a growth mindset state, and a probability of a state of not applicable to fixed mindset or growth mindset, wherein the determining is based on a natural language model trained with second data structures, the second data structures comprising training phrases indicated as having the fixed mindset state, training phrases indicated as having the growth mindset state, and training phrases indicated as not applicable to the fixed mindset state or the growth mindset state;

determining another score of the text based on a probability of the fixed mindset state, a probability of the growth mindset state, and a probability of the state of not applicable to fixed mindset or growth mindset; and causing to be displayed on the display of the user an indication of the another score of the text.

* * * * *